W. A. BALDWIN.
ADJUSTABLE WAGON TONGUE DEVICE.
APPLICATION FILED JAN. 11, 1916.
1,232,752.
Patented July 10, 1917.
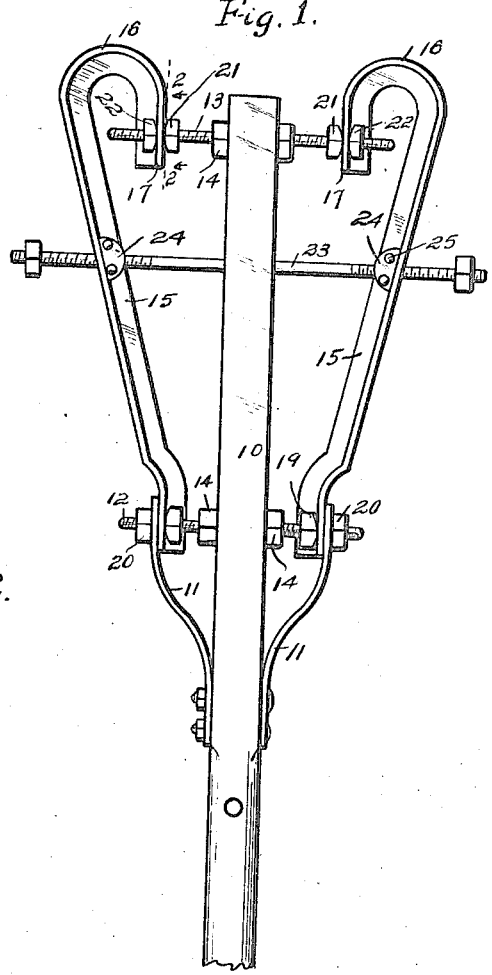
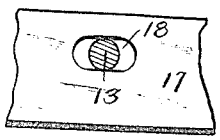
Witnesses
Will Freeman
Adele Sherman
Inventor
William A. Baldwin
BY Orwig & Bair
Attorneys.

UNITED STATES PATENT OFFICE.

WILLIAM ADNA BALDWIN, OF YALE, IOWA.

ADJUSTABLE WAGON-TONGUE DEVICE.

1,232,752. Specification of Letters Patent. Patented July 10, 1917.

Application filed January 11, 1916. Serial No. 71,456.

*To all whom it may concern:*

Be it known that I, WILLIAM A. BALDWIN, a citizen of the United States, and resident of Yale, in the county of Guthrie and State of Iowa, have invented a certain new and useful Adjustable Wagon-Tongue Device, of which the following is a specification.

The object of my invention is to provide an adjustable wagon tongue of simple, durable and inexpensive construction.

A further object is to provide a wagon tongue having members capable of simple and easy adjustment whereby the tongue may be fitted to the hound of any ordinary wagon.

My invention consists in the construction, arrangement and combination of the various parts of the device, whereby the objects contemplated are attained as hereinafter more fully set forth, pointed out in my claims and illustrated in the accompanying drawings, in which:

Figure 1 shows a top or plan view of the rear end of an adjustable wagon tongue embodying my invention, and Fig. 2 shows a detail, sectional view, taken on the line 2—2 of Fig. 1.

In the accompanying drawings, I have used the reference numeral 10 to indicate generally the rear end of a wagon tongue.

Secured to the opposite sides of the tongue, forwardly of the rear end thereof are strap irons 11, the rear ends of which curve outwardly and away from the tongue, as clearly shown in Fig. 1.

Mounted in the tongue 10 is a horizontal screw-threaded rod 12 arranged in a line with the rear ends of the members 11. Mounted in the tongue 10 near the rear end thereof, is a similar screw-threaded horizontal rod 13. Nuts 14 are mounted on the rods 12 and 13 on opposite sides of the tongue for holding said rods in position.

Mounted on the rod 12, on opposite sides of the tongue 10, are frame members 15, preferably made of angle irons having a horizontal and a vertical flange. The vertical flange of each member 15 is provided with a horizontally elongated slot to receive the rod 12. The members 15 extend rearwardly and away from the tongue 10, as shown in Fig. 1, and at their rear ends are curved inwardly toward the tongue at 16, and then forwardly at 17, the portion 17 being substantially parallel with the tongue. The vertical flanges of the portion 17 are provided with horizontally elongated slots 18 to receive the rod 13.

The forward end of the members 16 are mounted on the rod 12 inside the rear ends of the members 11. Nuts 19 are mounted on the rod 12 just inside the forward ends of the respective members 15, and nuts 20 are mounted on the rod 12 just outside the rear ends of the respective members 11. Nuts 21 are mounted on the rod 13 between the members 17 and the tongue 10, and nuts 22 are mounted on the rod 13 outside of the respective members 17.

A horizontal rod 23 is extended through the tongue 10, between the rods 12 and 13 and through suitable horizontal elongated slots in the members 15, similar to the slots 18, and beyond the respective members 15, as shown in Fig. 1.

The outer ends of the rod 23 are screw-threaded to receive suitable nuts, and are designed to be extended through portions of the hounds of a wagon. The vertical flanges of the members 15 are provided with horizontal plates or flanges 24 spaced from the horizontal flanges of said members above the rod 23. Bolts 25 are extended through the plates 24 and the horizontal flanges of the members 15 on opposite sides of the rod 23 to strengthen and reinforce the vertical flanges of said members 15, for carrying the load imposed on the rod 23 when the hounds are secured thereto.

It will readily be seen that the members 15 may be secured to and adjusted to various sizes and shapes of hounds by loosening the nuts 19, 20, 21 and 22, and swinging the ends of the members 15 inwardly or outwardly, as may be desired, and then moving the various nuts to position for locking the members 15 in the desired position.

Attention is called to the extreme simplicity and cheapness with which my improved adjustable tongue may be constructed and to the ease and quickness with which it may be adjusted to fit different hounds.

Some changes may be made in the construction and arrangement of the various parts of my improved adjustable wagon tongue without departing from the essential features and purposes thereof, and it is my intention to cover by this application any such changes which may be included within the scope of my claims.

I claim as my invention:

In a device of the class described, the combination of a pole with hound members spaced therefrom on opposite sides thereof, the rearward ends of said hound members being inclined inwardly and thence forwardly, the forward ends of said hounds being inclined from the bodies thereof at angles thereto, whereby when the hounds are inclined from their forward ends forwardly and outwardly away from the pole, the forward ends and rearward ends of said hounds may be parallel with said pole, rods extended through the pole and through the forward and rearward ends respectively of said hounds, said hounds having longitudinally elongated holes to receive and allow some play of said rods, nuts on said rods on opposite sides of each hound, a rod extended through the pole between the said first two rods and extended through said hounds, and brace devices for connecting the forward rod with the pole, the parts being so arranged as to permit adjustment of the hounds toward or from the pole, and to permit adjustment of the ends of the hounds with relation to each other and from the pole by adjustment of said nuts.

Des Moines, Iowa. December 8, 1915.

WILLIAM ADNA BALDWIN.